United States Patent [19]

McCue

[11] 4,420,939
[45] Dec. 20, 1983

[54] SOLAR BUILDING CONSTRUCTION

[76] Inventor: James H. McCue, P.O. Box 189, Columbia, Calif. 95310

[21] Appl. No.: 399,050

[22] Filed: Jul. 16, 1982

[51] Int. Cl.³ .............................................. F03G 7/02
[52] U.S. Cl. ..................................... 60/641.12; 98/32
[58] Field of Search ................... 60/641.11, 641.12; 98/31, 32, 45; 126/429

[56] References Cited

U.S. PATENT DOCUMENTS

| | | | |
|---|---|---|---|
| 3,614,922 | 10/1971 | Sobin | 98/32 |
| 4,018,581 | 4/1977 | Ruff et al. | 60/641.11 |
| 4,033,126 | 8/1977 | Newland | 60/641.12 |

Primary Examiner—Allen M. Ostrager
Attorney, Agent, or Firm—Lothrop & West

[57] ABSTRACT

A vertically inclined solar collector on the south side of a building not only provides a source of high velocity solar heated air from which energy is extracted by an air turbine generator, but it also serves to enhance the downward flow of relatively cool, dense air entering the north side of the building at an elevated location. The relatively cool air cools the interior of the building as the air descends and eventually flows into the bottom end of the collector. Interposed in the path of the cooling air is one or more air turbine generators which serve to extract energy from the cool air flow. Electrical storage batteries connected to the turbine generators provide a reservoir of electrical energy; and air washers, coolers and humidifiers increase the downward velocity and cooling effect of the cooling air.

10 Claims, 3 Drawing Figures

SOLAR BUILDING CONSTRUCTION

RELATED APPLICATIONS

The subject matter of this application was disclosed in Disclosure Document No. 083035 and in my patent application Ser. No. 168,612, filed July 14, 1980, for Solar Electric Power Plant And-Or Solar Cooled Building, now abandoned.

BACKGROUND OF THE INVENTION

The patent literature provides several examples of structures which benefit from the utilization of solar energy, particularly in connection with the convective flow of air.

U.S. Pat. No. 3,436,908 to Van Delic, dated Apr. 8, 1969, for instance, discloses a solar air moving system in which a sloping, open-ended, hollow conduit exposed to the sun results in an upward flow of heated air through the conduit. The energy in the ascending airflow is tapped to drive an electric generator.

Butler, Jr., U.S. Pat. No. 3,832,853, dated Sept. 3, 1974, utilizes radiant solar energy to heat air in vertical columns contained between spaced walls of glass which form the sides of a multi-story building. The energy in the rising air is used to generate power.

Carlson U.S. Pat. No. 3,894,393, dated July 15, 1975, generates power through controlled convection. Cooled air at the top of a duct located at a high altitude decends through the duct to the lower end where the energy of the relatively dense falling air mass is extracted by means of a turbine generator.

The foregoing patents, in summary, disclose independently operated means for generating power from both ascending and descending air flow.

There still remains, however, considerable room for improvement, particularly in conjunction with structures, such as office, commercial, industrial or residential buildings, which benefit from the enhanced flow of cooling air resulting from the cooperation between the flow of cooling air and the air movement into the open lower end of the solar collector.

SUMMARY OF THE INVENTION

The invention relates to a building construction using solar heat and air cooling in such a way as to create convective movements of air at high velocity. This high velocity air movement, from intake to exhaust, is harnessed, guided and directed in such a manner as not only to generate electricity but also to help cool the building.

SHORT DESCRIPTION OF THE DRAWING FIGURES

DETAILED DESCRIPTION OF A PREFERRED EMBODIMENT OF THE INVENTION

Figure 1:
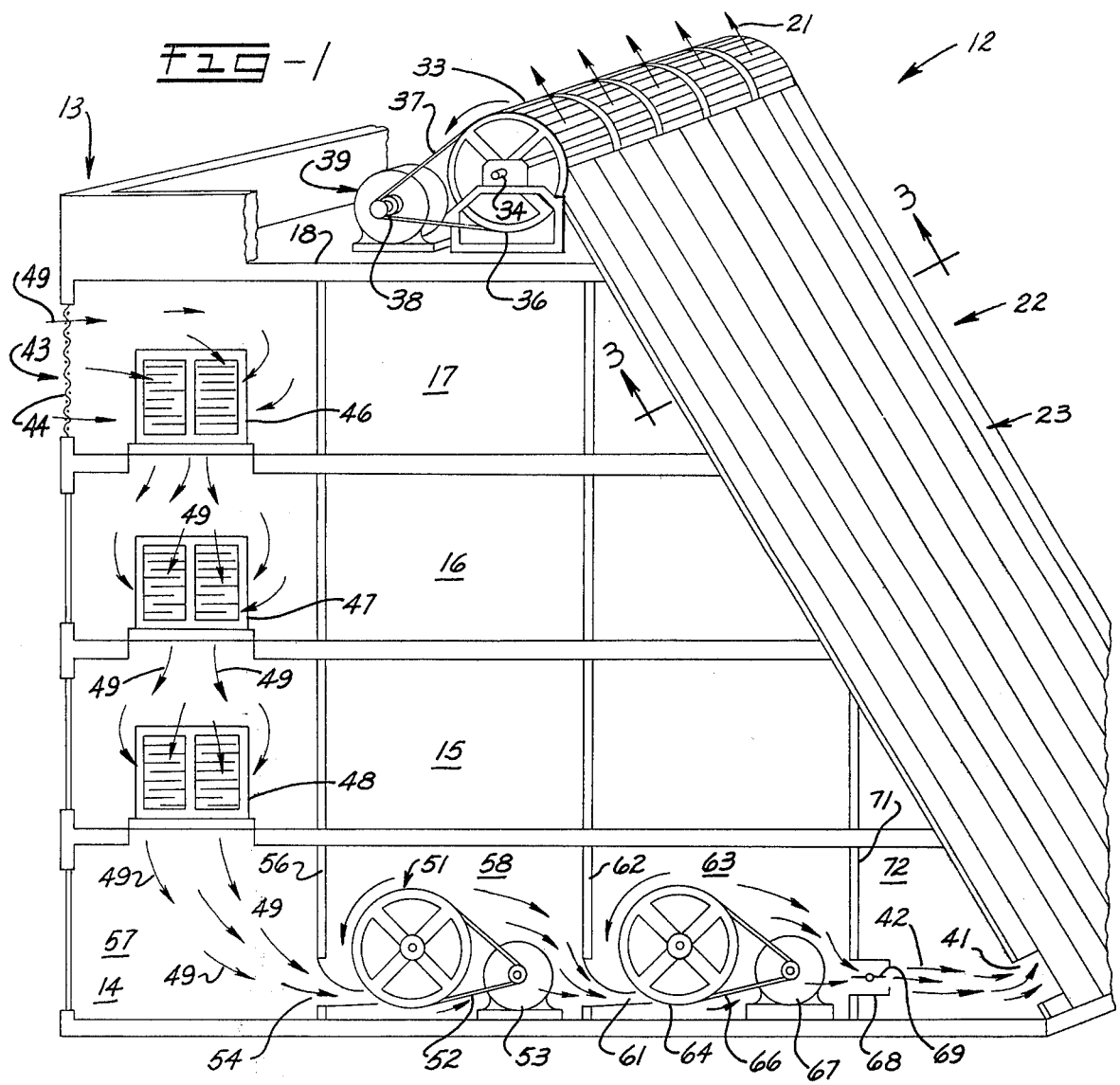
FIG. 1 is a schematic representation of a multi-story building with the side wall removed to illustrate the upward flow of heated air produced by a solar heat collector, shown in perspective, and the downward flow of cool air through the building and through the power producing equipment to the bottom of the collector, with portions of the figure being broken away to reduce the extent thereof.
Figure 2:
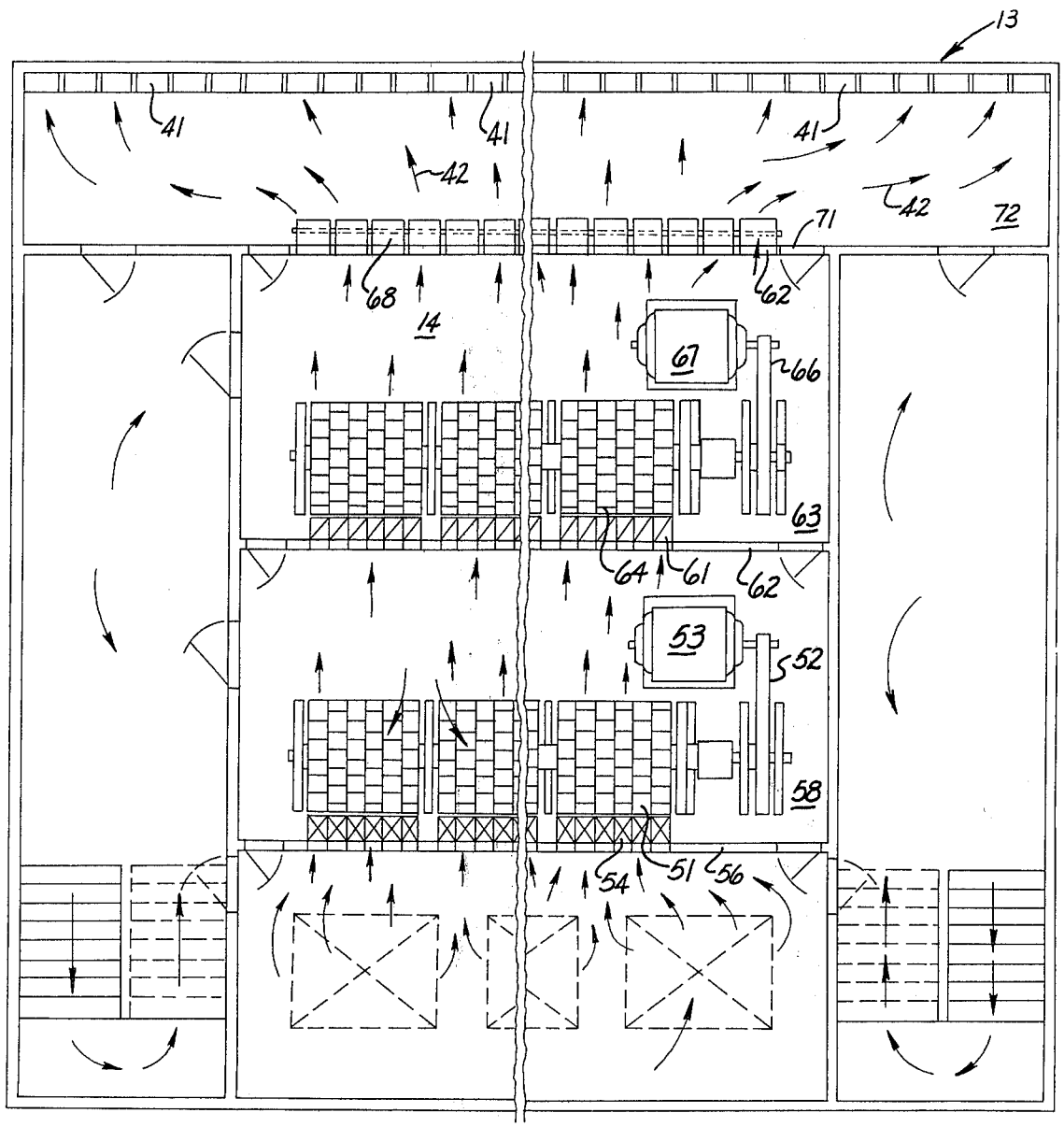
FIG. 2 is a floor plan of the ground floor of the building showing a typical layout of the power producing equipment; and, FIG. 3 is a fragmentary transverse sectional view of the solar heat collector to an enlarged scale, the plane of the section being indicated by the line 3—3 in FIG. 1.

The solar building construction of the invention, generally designated by the reference numeral 12, is illustrated most clearly in FIGS. 1 and 2, in schematic fashion, and includes a building 13 having a ground, or first, floor 14, a second floor 15, a third floor 16, a fourth floor 17, and a roof 18.

In order to provide an upward flow of air, as indicated by the arrows 21 in FIG. 1, a southerly facing solar heat collector 22 is provided. If desired, the collector 22 can be mounted on a turntable to follow the sun and thereby increase the energy obtainable from both morning and afternoon sun.

The collector 22 is preferably constructed so as to extend upwardly at an angle of about 60° from the ground floor 14 to an elevation slightly above the roof 18 so that the air flow 21 emerges at high velocity (e.g. 1200–1500 feet per minute) from the upper end of the collector.

Figure 3:
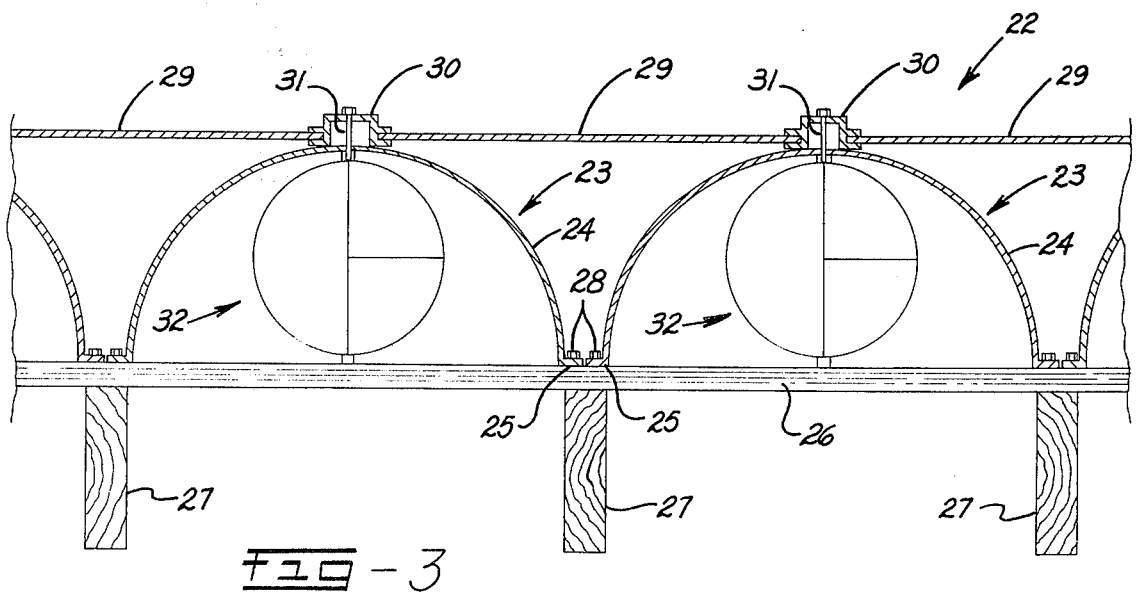

The high velocity is derived in large part from the unique construction of the collector elements, shown most clearly in FIG. 3, which illustrates two of the plurality of parallel elongated channels 23, or ducts, forming the collector 22.

Each of the channels 23, or ducts, is open at both its upper and lower ends and includes a semicircular in cross section wall 24 of sheet metal provided with marginal flanges 25 secured to panels 26, such as sheets of heavy plywood, supported on beams 27. The flanges 25 are secured by longitudinal rows of fastenings 28 extending through the respective flanges 25 into the subjacent plywood panels 26 and beams 27.

A plurality of transparent sheets 29 of material, such as glass, spans the tops of the semi-circular in section sheet metal ducts 23, the adjacent edges of the glass sheets being held by respective longitudinal strips 30 of molded plastic which, if desired, can be secured to the tops of the ducts by fastenings 31.

Radiant solar energy passes through the transparent glass panels 29 and heats the sheet metal walls 24 of the ducts 23, the external surfaces of which can be coated with black paint for maximum energy absorption.

Air which enters the open lower end of the ducts 23 is heated and rises through the ducts 23. As the air ascends it is swirled by a series of individual baffle elements 32 arranged in any suitable manner, such as a spiral. The mixing action of the baffle elements 32 assures that all of the air is exposed to the conductive heat of the sheet metal duct walls 24, and the swirling air wipes the inside surface of the ducts for more efficient heat transfer.

The highly heated air emerges from the upper end of the ducts 23, in the direction indicated by the directional arrows 21 in FIG. 1.

The rapidly moving air (1200 to 1500 feet per minute) is led through an air turbine 33 of the squirrel cage type, for example, journaled in bearings 34 and connected by pulley 36 and belt 37 to a pulley 38 on an electrical generator 39 mounted on the roof 18.

In this manner, electrical energy is extracted from the ascending air heated by radiant energy from the sun.

The southwardly facing aspect of the building is effectively utilized, in other words, to provide a source of valuable electric power during the daylight hours. Electrical storage batteries afford a reservoir effect.

The solar heat collector 22 is also used to help provide a downward draft of relatively cool air from the north side of the building, on the top floor.

Referring particularly to FIGS. 1 and 2, it can be seen that at the lower end of the collector ducts 23, openings 41 are provided at the southerly end of the bottom of the ground floor 14.

The upward convective current of air created by the collector 22 draws air into the bottom of the ducts 23, as shown by the directional arrows 42 in FIGS. 1 and 2.

This action helps to establish and maintain a flow of cooling air originating at an intake opening 43 on the north side of the top floor 17, the intake opening 43 being covered by a screen 44, or other suitable type of filter.

The relatively cool air passing through the intake opening 43 is led through a series of conventional air coolers, washers and humidifiers 46, 47 and 48 on respective floors 17, 16 and 15. Water is continuously recirculated in these coolers by small, fractional horsepower pumps powered from electrical storage batteries (not shown) charged by the main generator 39 on the roof.

The cooling air flow is shown by the directional arrows 49. On its downward path, as stated above, the air is further cooled. It is also saturated, i.e. humidified to the prevailing wet bulb temperature.

The air, upon being cooled and humidified, becomes even more dense and tends readily to descend toward the ground floor 14, en route to an air turbine 51. The air turbine is provided with staggered blades to provide a "blowby" effect for constant airflow, and is connected by a belt 52 to an eletrical generator 53.

Air speed to the turbine 51 is enhanced by a converging nozzle 54 located in a partition 56 separating the space 57 below the lower air cooler 48 and the space 58, or room, housing the air turbine 51.

The speed of the air emerging from the nozzle 54 and striking the blades of the air turbine 51 is preferably on the order of 4000 feet per minute.

After the rapidly moving cool air enters the air turbine 51 and causes the electrical generator 53 to produce power, it emerges from the turbine 51 and passes through a second converging nozzle 61 located in a partition 62 separating the generator room 58 from the generator space 63, or room, in which a second air turbine 64, belt 66 and electrical generator 67 are located.

Further electrical power is generated in the second generator 67; and, as the air emerges from the second turbine 64, it passes through a directional conduit 68 headed toward the openings 41 in the lower ends of the ducts 23. The multiple conduits 68 (see FIG. 2) are located in a wall 71, or partition, separating the seond generator room 63 from the bottom of the collector 22.

Thus, the air flowing in the direction of the arrows 42 passes first through the conduits 68 thence into a plenum 72, through the openings 41 and up the ducts 23 as the air is heated and becomes less dense.

As previously indicated, the upwardly moving hot air in the ducts 23 tends to "draw" the descending cool air. More properly stated, the descending, relatively dense cool air displaces the relatively light heated air in the ducts 23.

Cooperation between the two flows increases the overall efficiency of the system once the flow of air is established. On the left hand side, as appears in FIG. 1, the cool air descends and generates power in equipment located on the ground floor; and on the right hand side the hot air ascends and generates power in equipment located on the roof. Concurrently, the two flows work together to provide improved operational results.

Preferably, suitable air volume control valves 69 are located in the directional conduits 68 disposed between the second generator room 63 and the plenum 72 from which the solar collector 22 draws its supply of air. The control valves 69 are preferably actuated automatically by a conventional governor, not shown, on the shaft of the second air turbine 64 to position the pivoted plates so as to allow more or less air through the plant and the turbines. The revolutions per minute of the generators are thereby held at a more constant speed.

During operating hours, all openings in the exterior walls are preferably closed and sealed except for the intake opening 43. All of the "vacuum" created by the heated collector air exhaust 21 is thereby retained and the plant operates at maximum efficiency and capacity.

For best results, the air flowing through the structure is air cooled while operating, as previously explained. In large areas of the Southwestern portion of the United States evaporative air cooling is ideal. The wet and dry bulb temperatures are far apart and a comfortable temperature inside the building is the result. In more humid areas, a greater load is imposed on the system in order to operate more complicated coolers.

Preferably, the customary panel boards, switching gear and the like, not shown, would be located on the second floor 15, while the third floor 16 and the fourth floor 17 conveniently house the electrical batteries, not shown, kept charged by the plant's generators 39, 53 and 67.

I claim:
1. A solar building construction comprising:
 a. a structure having a floor, roof and side walls extending between said floor and said roof to enclose a substantially air tight space except for an elevated air inlet opening adjacent said roof and an air outlet opening adjacent said floor;
 b. a solar collector including a plurality of elongated open-ended vertically inclined air ducts, the bottom of said ducts being in communication with said outlet opening;
 c. a first air turbine generator in communication with the top of said ducts for rotation by the ascending solar heated air emerging from said ducts; and,
 d. means for conducting relatively cool air entering said structure through said air inlet opening downwardly through said structure and toward said air outlet opening.

2. A solar building construction as in claim 1 in which said air inlet opening is located on the north side of said structure and said solar collector is on the south side thereof.

3. A solar building construction as in claim 2 including a second air turbine generator interposed in the flow of the relatively cool air moving toward said air outlet opening.

4. A solar building construction as in claim 3 including means for washing, cooling and humidifying the relatively cool air to the prevailing wet bulb temperature.

5. A solar building construction as in claim 4 including a converging nozzle interposed in the flow of the relatively cool air, said nozzle being located so that the air emerging therefrom impinges at high velocity against the turbine blades of said second air turbine generator.

6. A solar building construction as in claim 5 including a directional conduit interposed in the flow of the relatively cool air, said directional conduit being located so that the air emergent from the turbine blades of said second air turbine generator flows toward said air outlet opening and said bottom of said solar collector ducts.

7. A solar building construction as in claim 6 further including a third air turbine generator interposed between said second air turbine generator and said directional conduit so that the air emergent from the turbine blades of said third air turbine generator flows toward said air outlet opening and said bottom of said collector ducts.

8. A solar building construction as in claim 7 in which said first air turbine generator is located on said roof, and in which said second and third air turbine generators are located on said floor.

9. A solar building construction as in claim 8 in which said structure is multi-storied, and in which said air washing, cooling and humidifying means is located on at least one story.

10. A solar building construction as in claim 9 further including a plurality of electrical storage batteries connected to the generators of said air turbine generators.

* * * * *